US009164930B2

(12) United States Patent
Zeng et al.

(10) Patent No.: US 9,164,930 B2
(45) Date of Patent: Oct. 20, 2015

(54) MULTI-DEVICE DOCKING WITH A DISPLAYPORT COMPATIBLE CABLE

(75) Inventors: Henry Zeng, Sunnyvale, CA (US); Ji Park, Morgan Hill, CA (US)

(73) Assignee: Synaptics Incorporated, San Jose, CA (US)

( * ) Notice: Subject to any disclaimer, the term of this patent is extended or adjusted under 35 U.S.C. 154(b) by 978 days.

(21) Appl. No.: 13/167,589

(22) Filed: Jun. 23, 2011

(65) Prior Publication Data

US 2012/0066425 A1    Mar. 15, 2012

Related U.S. Application Data

(60) Provisional application No. 61/383,269, filed on Sep. 15, 2010.

(51) Int. Cl.
  *G06F 13/00*  (2006.01)
  *G06F 13/14*  (2006.01)
(52) U.S. Cl.
  CPC .............. *G06F 13/14* (2013.01); *G06F 13/00* (2013.01)
(58) Field of Classification Search
  USPC ................... 710/7, 11, 12, 65, 300, 303, 105
  See application file for complete search history.

(56) References Cited

U.S. PATENT DOCUMENTS

| 7,788,412 | B2 * | 8/2010 | Guo et al. ......................... 710/1 |
| 7,904,620 | B2 | 3/2011 | Yao et al. |
| 8,151,018 | B2 | 4/2012 | Mohanty et al. |
| 2008/0052426 | A1 * | 2/2008 | Montag ........................... 710/62 |
| 2008/0052428 | A1 * | 2/2008 | Liang et al. ..................... 710/62 |
| 2008/0055189 | A1 * | 3/2008 | Wilk et al. ..................... 345/1.3 |
| 2008/0288702 | A1 * | 11/2008 | Diab et al. .................... 710/304 |
| 2009/0187686 | A1 | 7/2009 | Goodart et al. |
| 2010/0177016 | A1 | 7/2010 | Zeng |
| 2010/0177017 | A1 | 7/2010 | Zeng et al. |
| 2010/0183004 | A1 * | 7/2010 | Kobayashi .................... 370/389 |
| 2010/0185792 | A1 * | 7/2010 | Yao et al. ........................ 710/33 |
| 2010/0272102 | A1 | 10/2010 | Kobayashi |
| 2011/0243035 | A1 * | 10/2011 | Hall et al. ..................... 370/276 |
| 2012/0079162 | A1 | 3/2012 | Jaramillo |

OTHER PUBLICATIONS

VESA DisplayPort Standard, Version 1, Revision 1a, Jan. 11, 2008.
VESA DisplayPort Standard, Version 1, Revision 2, Jan. 5, 2010.

* cited by examiner

*Primary Examiner* — Khanh Dang
(74) *Attorney, Agent, or Firm* — Osha•Liang LLP

(57) ABSTRACT

A docking system utilizing a single DisplayPort cable connection to a computer system is provided. In one embodiment, the docking system includes a single DisplayPort ("DP") input, a management layer module coupled to receive video inputs from the single DP input and to provide video data to at least one video monitor output, and a USB layer module coupled to receive an AUX channel from the single DP input and to couple the AUX channel with a USB hub.

15 Claims, 5 Drawing Sheets

| Output / Input | DP MST | HDMI/DVI DP SST |
|---|---|---|
| DP MST | MST Repeater | MST/SST Converter |
| DP SST | X | Image Splitter |

Figure 4

MULTI-DEVICE DOCKING WITH A DISPLAYPORT COMPATIBLE CABLE

CROSS-REFERENCE

This application claims the benefit of U.S. Provisional Patent Application Ser. No. 61/383,269 filed on Sep. 15, 2010, which is hereby incorporated by reference in its entirety.

BACKGROUND

1. Technical Field

Some embodiments according to the present invention relate to multi-device docking utilizing a DisplayPort compatible cable.

2. Discussion of Related Art

The DisplayPort standard is a video standard for providing video data between digital devices and display devices. The current DisplayPort standard can provide for both high-resolution video and audio data. Data is transmitted between a source and a display over 1, 2, or 4 lanes of data. In the DisplayPort standard, an Auxiliary channel is utilized to communicate control data and a hot plug line is utilized to indicate to a DisplayPort source that a DisplayPort device is active. As the DisplayPort standard becomes more widespread, there is increasing interest in devices that utilize the standard. There is also interest in providing for the integrity of signals utilized in the DisplayPort systems.

Therefore, there is a need for improved integrity of various signals and better capabilities in the DisplayPort standard.

SUMMARY

In accordance with some embodiments of the present invention, a docking system includes a single display port input; a management layer coupled to receive video inputs from the single display port input and to provide video data to at least one video monitor output; and a USB layer coupled to receive an AUX channel from the single display port input and to couple the AUX channel with a USB hub.

These and other embodiments are further disclosed below with reference to the following drawings.

BRIEF DESCRIPTION OF THE DRAWINGS

FIG. 4 illustrates the data flow input/output matrix for the circuit shown in FIG. 3.

DETAILED DESCRIPTION

The DisplayPort standard is fully described in the VESA DisplayPort Standard, Version 1, Revision 1a, released Jan. 11, 2008, available from the Video Electronics Standard Association (VESA), 860 Hillview Court, Suite 150, Milpitas, Calif. 95035, which is herein incorporated by reference in its entirety. Subsequent versions, including the DisplayPort Version 1.2, are available from the same source, and are also hereby incorporated by reference in their entireties. One skilled in the art will recognize that embodiments of the present invention can be utilized with other video display standards that utilize bi-directional control lines such as the Auxiliary channel in the DisplayPort standard.

In some embodiment of the invention, docking or a port-replicator allows coupling from a single cable to multiple video devices. Thusly, docking is available for devices such as a notebook, netbook, and tablet type computer systems. Docking utilizing the DisplayPort standard allows for the transfer of uncompressed video, or display data, to multiple display devices utilizing a variety of different standards.

In general, netbook or compact notebook systems do not have the space for a docking connector and are generally priced sufficiently low that the cost of a docking connector is not included. Such systems will typically include a USB port suitable for enabling USB port-replication; however, USB port-replicators are unsuitable for the transmission of uncompressed display data. In particular, the USB port does not have sufficient bandwidth for the transfer of uncompressed display data. Additionally, the USB port shares bandwidth with other USB devices coupled to the system. Moreover, compression of video data results in a loss of display quality. Still further, driving USB devices imposes a heavy computational load on the system.

Figure 1:
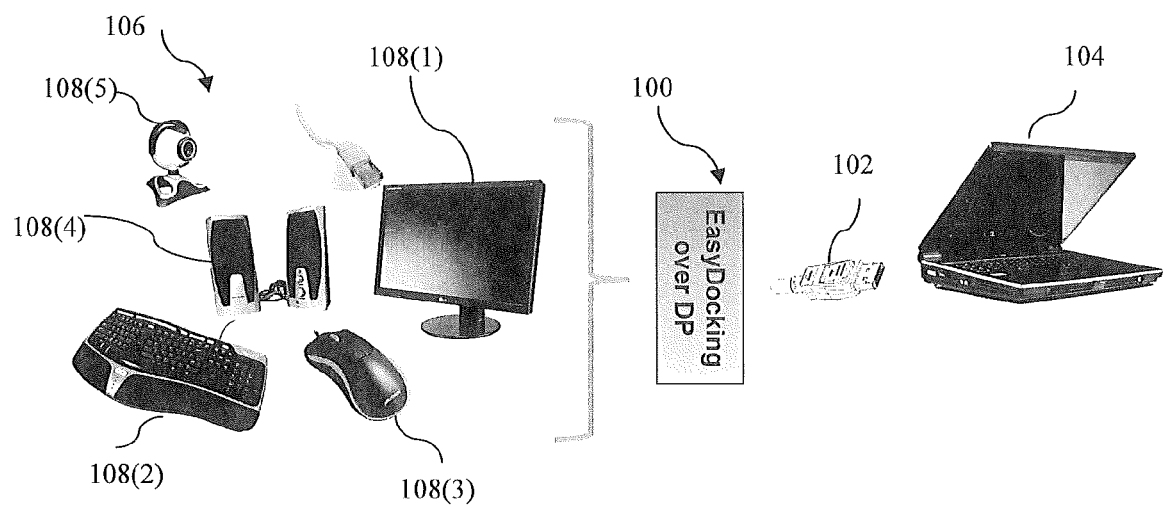
FIG. 1 illustrates a system utilizing a docking system according to some embodiments of the present invention.

FIG. 1 illustrates a system utilizing a docking system 100 according to some embodiments of the present invention. As shown in FIG. 1, the docking system 100 comprises a single DisplayPort ("DP") cable 102, which couples to a computer system 104 via an appropriate connector/port pair. As will be described in greater detail below, the docking system 100 is utilized to communicate video, audio, and peripheral signals in accordance with the DisplayPort standard between the computer system 104 and peripherals 106. In some embodiments, the peripherals 106 may include, for example, one or more video monitors 108(1), keyboards 108(2), pointing devices 108(3), speakers 108(4), and cameras 108(5).

Figure 2:
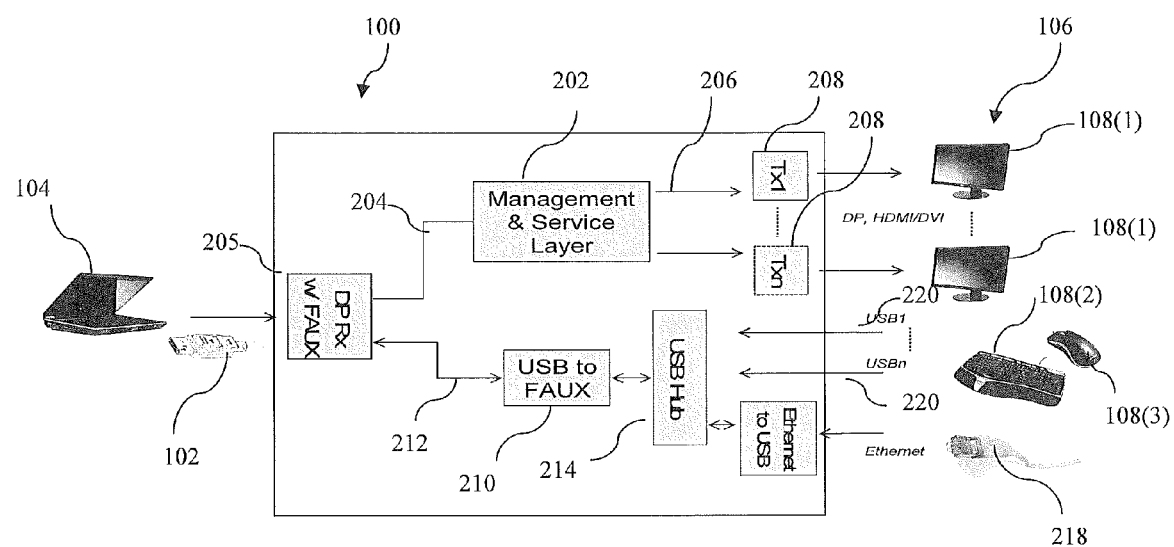
FIG. 2 illustrates the docking system shown in FIG. 1.

Referring now to FIG. 2, which is a more detailed block diagram of the docking system 100 of FIG. 1, the docking system includes a management service layer module 202 comprising appropriate hardware and associated software for receiving video input signals 204 from the DP cable 102 via an input 205 and providing video data 206 to one or more video monitor outputs, represented in FIG. 2 by outputs 208. Additionally, the embodiment shown in FIG. 2 comprises a USB layer module 210 comprising appropriate hardware and associated software for receiving an auxiliary ("AUX") and/or fast AUX ("FAUX") channel 212 from the DP cable 102 via the input 205 and providing the AUX channel to USB hub 214. As illustrated in FIG. 2, the USB hub 214 can also be used to drive an Ethernet coupling 218.

Although FIG. 2 illustrates utilization of USB ports 220 coupled to the USB hub 214 for interfacing with peripherals, such as keyboards 108(2) and pointing devices 108(3), any other standard or set of standards may be utilized for peripherals. Further, video output may be provided via the outputs 208 in accordance with any video standard, including DisplayPort, VGA, or some other standard.

In general, as illustrated in FIG. 2, an embodiment of the docking system 100 separates a DisplayPort auxiliary channel from DisplayPort transmission channels. The DisplayPort transmission channels can then be utilized to provide video and sound to multiple video display devices and audio devices (e.g., speakers), while the AUX channel can be utilized to drive a USB hub, which in turn can be utilized to couple input devices, such as keyboards and other pointing devices, to the computer system 104. The USB hub can further be utilized to drive other standards, such as an Ethernet coupling.

As will be further described below, a docking system according to some embodiments of the present invention is highly versatile. For example, in some embodiments, docking system 100 can receive a hybrid input compatible with either DisplayPort (DP) 1.2 MST (multi-stream) or DP 1.1 SST (Single-Stream) or HDMI, DVI, or Dual-DVI, and can output one of four hybrid outputs (DP, HDMI, DVI, or Dual DVI, for example). The hybrid outputs can be, for example, a daisy chain multi-monitor. A DP 1.2 MST input can be provided to 4xDP MST dongle, a 4xHDMI/DVI MST dongle, or a 2x dual-DVI MST dongle. A DP 1.1 (SST) input can be converted to a 4xDP/HDMI/DVI ViewXpand dongle. An HDMI input can be converted to a 4xDP/HDMI/DVI dongle or a DP adapter. A dual-DVI input can be converted to a 4xDP/HDMI/DVI dongle or a DP adapter. A DP 1.2 or 1.1 input can be converted to a HDMI/DVI adapter or a Dual-DVI adapter.

Figure 3:
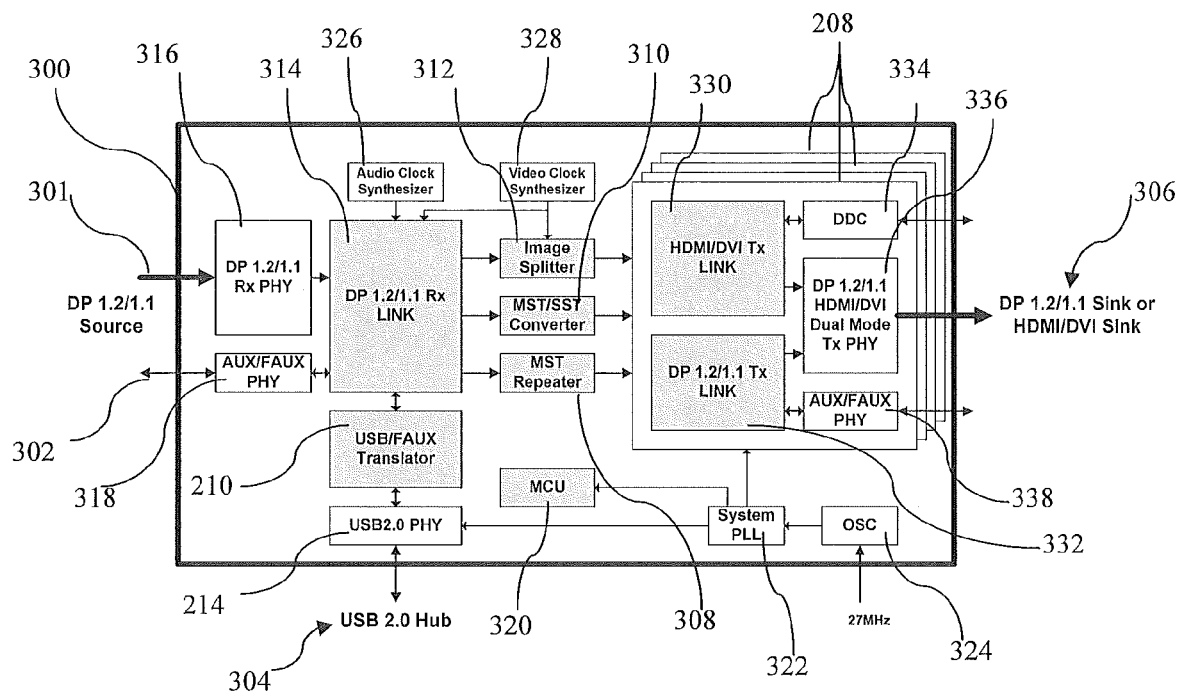
FIG. 3 illustrates a more detailed block diagram of the docking system shown in FIG. 2.

FIG. 3 illustrates a more detailed block diagram of some embodiments of a circuit 300 for implementing the docking system 100 shown in FIGS. 1 and 2. Circuit 300 receives a hybrid input compatible with DisplayPort (DP) 1.2 MST, DP 1.1, HDMI, DVI, and/or Dual-DVI and outputs four hybrid outputs (DP, HDMI, DVI, and/or Dual DVI), as described above.

As shown in FIG. 3, a DP data source 301 and an auxiliary channel 302, which may be the fast auxiliary channel (FAUX channel) of DP 1.2, are input to circuit 300 to be received in DP receiver 316 and AUX/FAUX receiver 318. As shown in FIG. 3, input signal 301 can be DP 1.2 (MST) or DP 1.1 (SST) standard inputs. As described with FIG. 2, HDMI, DVI, and Dual DVI standards may also be utilized.

DP receiver 316 and AUX/FAUX receiver 318 are included in input 205 shown in FIG. 2. The received signals from DP receiver 316 and AUX/FAUX receiver 318 are input to DP receive link 314. Data from the AUX/FAUX channel 302, which is digitally output by AUX/FAUX receiver 318, is interpreted by link 314 and the USB portion provided to USB/FAUX translator 210, which is utilized to drive a USB hub 214 to provide USB signals 304. USB hub 214 may be a USB 2.0 hub driver. Auxiliary channel signals 302 may include USB data as well as other data related to the DisplayPort standard that is communicated from a source such as source 104. As shown in FIG. 2, further communications standards such as Ethernet standards may also be utilized.

Link 314 further receives video and audio data according to the DisplayPort standard from DP receiver 314. Link 314 further receives a synthesized audio clock from audio clock synthesizer 326 and a video clock signal from video clock synthesizer 328. Audio clock synthesizer 326 and video clock synthesizer 328 generate clock signals based on the received digital data streams in link 314.

As shown in FIG. 2, the video and audio data can be distributed to any number of video displays 108 by transmitters 208. As described above, the output format from each of transmitters 208 can conform with one of many standards, of which DP 1.2, DP 1.1, HDMI, and DVI are examples.

As shown in FIG. 3, video data in source 301 is converted to an output 306 for each of transmitters 208. FIG. 4 illustrates a data flow input/output matrix 400 for circuit 300 illustrated in FIG. 3. In particular, for the case in which source 301 is DP 1.2 MST, the output signal can be converted to DP 1.2 MST utilizing an MST repeater 308 and may be converted to HDMI, DVI, or DP 1.1 SST formats utilizing an MST to SST converter 310. In the case where source 301 is a DP 1.1 SST input, then a output 306 can be in which DP SST is input, HDMI/DVI or DP 1.1 SST is provided to signal 306 by conversion through image splitter 312 (FIG. 3).

As shown in FIG. 3, the output data streams from link 326 are input to image splitter 312, MST/SST converter 310, and MST repeater 308. Image splitter 312 takes a larger-dimensioned video image and splits the image into multiple smaller-dimensioned video images for display on multiple monitors. Some examples of image splitter 312 are described in U.S. application Ser. No. 12/634,571, filed as a continuation of U.S. application Ser. No. 12/12/353,132 on Dec. 9, 2009, which is herein incorporated by reference in its entirety.

MST to SST converter 310 receives a DP 1.2 multi-stream (MST) video data set and outputs multiple DP 1.1 single-stream (SST) data streams. In some embodiments, each SST data stream can be split with an image splitter such as image splitter 312 to provide for multiple images to be sent to transmitters 208.

MST repeater 308 receives a DP 1.2 multi-stream (MST) video data set and repeats the data set. In some embodiments, the DP 1.2 MST data set can split each of the individual data streams for transmission to multiple monitors. In particular, each stream of the multi-stream data split can be split to provide for a smaller dimensioned image and the smaller dimensioned multi-stream data is sent on to transmitters 208.

Each of transmitters 208 receives data from link 314 through image splitter 312, MST/SST converter 310, and MST repeater 308 for transmission according to a particular standard to a corresponding one of displays 108. As shown in FIG. 3, transmitter 208 includes an HDMI/DVI transmit link 330 and a DP transmit link 332. Transmitter 208 receives the data stream from link 314 and converts the data stream, either through DP transmitter 332 or HDMI/DVI transmitter 330, to a standard format for output signal 306. Appropriate formatting and signals are transmitted by transmitter 336 for the chosen output formal. An Aux/Faux transmitter 338 is utilized with the DP transmitter 332 and a DDC 334 transmitter is utilized with HDMI/DVI transmitter 330.

Therefore, as shown in FIG. 3, a DP source signal is received in DP receiver 316 and AUX/FAUX receiver 302 and processed in link 314. USB signals transmitted through AUX/FAUX data 302 is coupled through USB/FAUX translator 210 to a USB hub 214. Video data is further processed through image splitter 312, MST/SST converter 310, or MST repeater 308 for each of transmitters 208 according to the format that is provided at output signal 306. Transmitter 208 then provides that appropriate data transmissions for output signal 306. An MCU 320 is provided to control the flow of data and the settings describing input signal 301 and output signal 306 for each of displays 108. Timing is provided by an oscillator 324 coupled through a system PLL 322.

Figure 5:
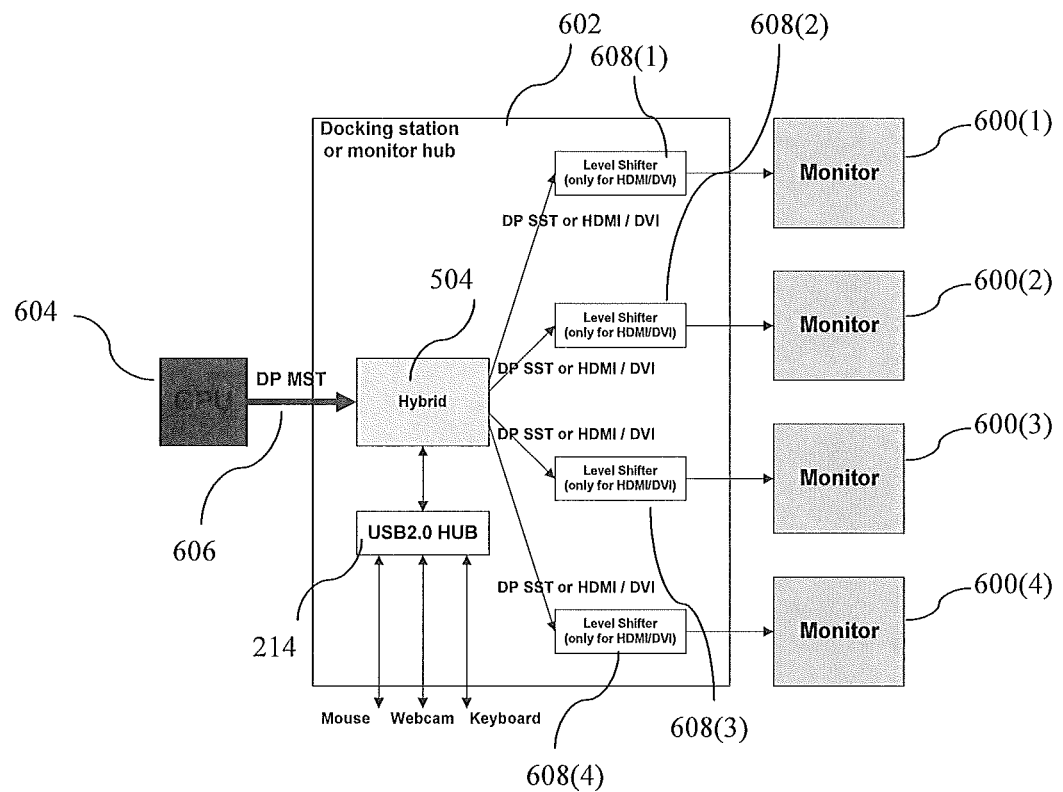
FIG. 5 illustrates an example application with a fan-out of docking systems as illustrated in FIGS. 2 and 3.

As illustrated in FIG. 5, multiple display systems, represented in FIG. 5 by monitors 600(1)-600(4), can be operated in a fan-out configuration via a single docking system 602, which is implemented in a manner similar to the docking system 100 as illustrated in FIGS. 2 and 3. A GPU 604 originates a DP MST signal 606 to the docking system 602.

As shown in FIG. 6, the output signals of the docking system 602 can comprise a DP-compatible output signal. Additionally, level shifters, represented in FIG. 6 by level shifters 608(1)-608(4), may be optionally included in each of the docking systems 602, to provide HDMI/DVI outputs for the monitors 600(1)-600(4). With DP SST, the source (i.e., the GPU) receives Display Identification Data ("EDID" or "DID") synthesized from the downstream devices. With DP MST, the GPU may receive multiple independent EDID/DID via a remote I2C read.

Consistent with DP 1.2, the FAUX and AUX channel can operate at 720 MHz or 1 MHz, respectively. A system utilizing both provides for transmission and receipt of the channels as well as for a FAUX squelch detection. Clock inputs are typically 27 MHz for DP compatible systems. Outputs for the FAUX channel can be 72 MHz, the MCU may be 270 MHz, video and audio clock synthesizer may be at 270 MHz, and the USB operates at about 12 MHz.

The embodiments of the invention described here are exemplary only and are not intended to limit the scope of the invention. One skilled in the art may recognize various modifications to the embodiments specifically described. These modifications are intended to be within the scope of this disclosure. As a result, the invention is limited only by the following claims.

What is claimed is:

1. A docking system, comprising:
   a single DisplayPort (DP) input;
   a first video monitor output;
   a second video monitor output;
   a management layer module coupled to receive a video input signal in a video input signal format from the single DP input, and configured to:
      provide a first video output signal in a video output signal format, including at least part of the video input signal, to the first video monitor output,
      convert at least part of the video input signal from the video input signal format to a converted video output signal format to create a second video output signal, and
      provide the second video output signal to the second video monitor output; and
   a Universal Serial Bus (USB) layer module coupled to receive an auxiliary (AUX) channel from the single DP input and operatively connecting the AUX channel with a USB hub, wherein the USB hub (i) is co-located with both the USB layer module and the management layer module in the docking system, and (ii) is physically separate from a monitor.

2. The docking system of claim 1, wherein the USB layer module further couples the AUX channel with an Ethernet port.

3. The docking system of claim 1, wherein the video input signal format is at least one selected from a group consisting of DP multi-stream transport (MST) format, DP single-stream transport (SST) format, high-definition multimedia interface (HDMI) format, digital visual interface (DVI) format, and dual DVI format.

4. The docking system of claim 1, wherein the AUX channel comprises a fast AUX (FAUX) channel.

5. The docking system of claim 1, wherein the video input signal format is DP single-stream transport (SST) format, the video output signal format is at least one selected from a group consisting of DP SST format and DP multi-stream transport format, and the converted video signal format is at least one selected from a group consisting of high-definition multimedia interface (HDMI) format, digital visual interface (DVI) format, and dual DVI format.

6. The docking system of claim 1, wherein:
   the video input signal format is DP multi-stream transport (MST) format;
   the video input signal comprises a plurality of video streams;
   the video output signal comprises a first video stream of the plurality of video streams;
   the converted video output signal comprises a second video stream of the plurality of video streams;
   the video output signal format is at least one selected from a group consisting of DP single-stream transport (SST) format and DP multi-stream transport (MST) format; and
   the converted video output signal format is at least one selected from a group consisting of high-definition multimedia interface (HDMI) format, digital visual interface (DVI) format, and dual DVI format.

7. The docking station of claim 1, further comprising a third video monitor output, and wherein:
   the management layer module is further configured to provide a third video output signal to the third video monitor output;
   the video input signal is DP multi-stream transport (MST) format and comprises a plurality of video streams;
   the first video output signal comprises a first portion of the first video stream of the plurality of video streams and is provided to the first video monitor output;
   the second video output signal comprises a second portion of the first video stream and is provided to the second monitor output; and
   the third video output signal comprises a second stream of the plurality of streams and is provided to the third video monitor output.

8. A method of implementing a docking system, the method comprising:
   receiving a video input signal in a video input signal format via a single DisplayPort (DP) input port;
   providing, via a management layer module, a first video output signal in a video output signal format, including at least part of the video input signal, to a first video monitor output;
   converting at least part of the video input signal from the video input signal format to a converted video output signal format to create a second video output signal;
   providing the second video output signal to a second video monitor output; and
   coupling, via a Universal Serial Bus (USB) layer module, an auxiliary (AUX) channel of the video input signal to a USB hub, wherein the USB hub (i) is co-located with both the USB layer module and the management layer module in the docking system, and (ii) is physically separate from a monitor.

9. The method of claim 8, further comprising coupling, via the USB layer module, the AUX channel with an Ethernet port.

10. The method of claim 8 wherein the video input signal format is one selected from a group consisting of at least one of DP multi-stream transport (MST) format, DP single-stream (SST) format, high-definition multimedia interface (HDMI) format, digital visual interface (DVI) format, and dual DVI format.

11. The method of claim 8, wherein:
   the video input signal format is DP multi-stream transport (MST) format;
   the video input signal comprises a plurality of video streams;
   the first video output signal comprises a first video stream of the plurality of video streams;
   the second video output signal comprises a second video stream of the plurality of video streams;
   the video output signal format is at least one selected from a group consisting of DP single-stream transport (SST) format and DP multi-stream transport (MST) format; and
   the converted video output signal format is at least one selected from a group consisting of high-definition multimedia interface (HDMI) format, digital visual interface (DVI) format, and dual DVI format.

12. The method of claim 8, wherein the AUX channel comprises a fast AUX (FAUX) channel.

13. The method of claim 8, wherein the video input signal format is DP single-stream transport (SST) format, the video output signal format is at least one selected from a group consisting of DP SST format and DP multi-stream transport (MST) format, and the converted video signal format is at least one selected from a group consisting of high-definition multimedia interface (HDMI) format, digital visual interface (DVI) format, and dual DVI format.

14. The method of claim 8, wherein coupling the AUX channel to the USB hub comprises providing USB data from one or more USB ports of the USB hub to the AUX channel of the DP input port.

15. The method of claim 8, further comprising providing, by the management layer module, a third video output signal to a third video monitor output, and wherein:
   the video input signal is DP multi-stream transport (MST) format and comprises a plurality of video streams;
   the first video output signal comprises a first portion of the first video stream of the plurality of video streams and is provided to the first video monitor output;
   the second video output signal comprises a second portion of the first video stream and is provided to the second monitor output; and
   the third video output signal comprises a second stream of the plurality of streams and is provided to the third video monitor output.

* * * * *